United States Patent
Chen et al.

(10) Patent No.: US 10,726,336 B2
(45) Date of Patent: Jul. 28, 2020

(54) APPARATUS AND METHOD FOR COMPRESSION CODING FOR ARTIFICIAL NEURAL NETWORK

(71) Applicant: CAMBRICON TECHNOLOGIES CORPORATION LIMITED, Beijing (CN)

(72) Inventors: Tianshi Chen, Beijing (CN); Shaoli Liu, Beijing (CN); Qi Guo, Beijing (CN); Yunji Chen, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

(21) Appl. No.: 16/508,139

(22) Filed: Jul. 10, 2019

(65) Prior Publication Data
US 2019/0332945 A1    Oct. 31, 2019

Related U.S. Application Data

(63) Continuation of application No. 16/041,160, filed on Jul. 20, 2018, now Pat. No. 10,402,725, which is a (Continued)

(30) Foreign Application Priority Data

Jan. 20, 2016    (CN) .......................... 2016 1 0039026

(51) Int. Cl.
*G06N 3/08*    (2006.01)
*G06N 3/00*    (2006.01)
(Continued)

(52) U.S. Cl.
CPC .......... *G06N 3/084* (2013.01); *G06F 7/4876* (2013.01); *G06N 3/00* (2013.01); *G06N 3/063* (2013.01); *G06F 2207/4824* (2013.01)

(58) Field of Classification Search
CPC ................................. G06F 15/18; G06N 3/084
(Continued)

(56) References Cited

U.S. PATENT DOCUMENTS

2009/0289819 A1* 11/2009 Mahoney ................ H03M 7/24
                                                                341/51
2016/0328646 A1* 11/2016 Lin .......................... G06N 3/08
(Continued)

FOREIGN PATENT DOCUMENTS

CN            1700250 A      11/2005
CN            105184366      12/2015

OTHER PUBLICATIONS 201610039026.6—Office Action, dated Sep. 29, 2019, 9 pages. (no English translation).
(Continued)

*Primary Examiner* — David R Vincent
(74) *Attorney, Agent, or Firm* — Getech Law LLC; Jun Ye

(57) ABSTRACT

A compression coding apparatus for artificial neural network, including memory interface unit, instruction cache, controller unit and computing unit, wherein the computing unit is configured to perform corresponding operation to data from the memory interface unit according to instructions of controller unit; the computing unit mainly performs three steps operation: step one is to multiply input neuron by weight data; step two is to perform adder tree computing and add the weighted output neuron obtained in step one level-by-level via adder tree, or add bias to output neuron to get biased output neuron; step three is to perform activation function operation to get final output neuron. The present disclosure also provides a method for compression coding of multi-layer neural network.

24 Claims, 5 Drawing Sheets

Related U.S. Application Data continuation-in-part of application No. PCT/CN2016/078448, filed on Apr. 5, 2016.

(51) Int. Cl.
*G06F 7/487* (2006.01)
*G06N 3/063* (2006.01)

(58) Field of Classification Search
USPC .................................................... 706/15, 45
See application file for complete search history.

(56) References Cited

U.S. PATENT DOCUMENTS

| 2017/0169331 A1* | 6/2017 | Garner | G06N 3/082 |
| 2019/0073582 A1* | 3/2019 | Yang | G06K 9/00986 |

OTHER PUBLICATIONS 201810151978.6—Office Action, dated Aug. 20, 2019,11 pages. (no English translation).
Chou, et al., "VEGAS: Soft Vector Processor with Scratchpad Memory", FPGA '11, Feb. 27-Mar. 1, 2011, 10 pages.
201610037535.5, First Office Action dated Sep. 25, 2019, 21 pages, with translation.

\* cited by examiner

APPARATUS AND METHOD FOR COMPRESSION CODING FOR ARTIFICIAL NEURAL NETWORK

TECHNICAL FIELD

The present disclosure relates to the field of artificial neural network processing technology and specifically to an apparatus and method for compression coding for artificial neural network. Particularly, it relates to execution units for performing the method of artificial neural network algorithm or devices comprising these execution units, and execution units for apparatus and method for multi-layer artificial neural network operation, reverse propagation training algorithm and its compression coding as well as devices comprising these execution units.

BACKGROUND

A multi-layer artificial neural network is widely used in fields like pattern recognition, image processing, function approximation and optimized computation etc. Particularly as studies on reverse propagation training algorithm and pre-training algorithm go deeper and deeper in recent years, the multi-layer artificial neural network attracts more and more attention from the academic and industrial fields due to its higher recognition accuracy and better parallelizability.

With the surge in computing and accessing amount in artificial neural network, prior arts generally utilize general processor to process multi-layer artificial neural network operation, training algorithm and its compression coding and the above algorithms are supported by utilizing general register file and general functional component to execute general instructions. One of the disadvantages for using general processor is that the low computing performance of a signal general processor cannot meet the needs for the performance of multi-layer artificial neural network operation. Meanwhile, if multiple general processors are working concurrently, the intercommunication between general processors will limit its performance. In addition, general processor needs to transcode a multi-layer artificial neural network operation into a long sequence of operation and access instruction, and this front-end transcoding of processor causes relatively high power consumption. Another known method for supporting multi-layer artificial neural network operation, training algorithm and its compression coding is to use graphics processing unit (GPU). This method supports the above algorithms by using general register file and general stream process unit to execute general SIMD instructions. Since GPU is specifically used for executing graphics and image computing and scientific calculation, it does not provide specific support to multi-layer artificial neural network operation, and thus a lot of front-end transcoding is still required to perform multi-layer artificial neural network operation, and as a result large additional costs are incurred. Besides, GPU only has relatively small on-chip cache, model data (weight) of multi-layer artificial neural network needs to be carried repeatedly from outside of the chip, and off-chip bandwidth becomes the main bottleneck for its performance and causes huge power consumption as well.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for compression coding. An example apparatus may include a floating-point number converter configured to receive one or more first weight values of a first bit length and first input neuron data, and convert the one or more first weight values to one or more second weight values of a second bit length, wherein the second bit length is less than the first bit length; and a computing unit configured to receive the first input neuron data from the neuron data cache, calculate first output neuron data based on the first input neuron data and the second weight values, and calculate one or more weight gradients to update the one or more first weight values.

An example method may include receiving one or more first weight values of a first bit length; receiving first input neuron data; converting the one or more first weight values to one or more second weight values of a second bit length, wherein the second bit length is less than the first bit length; calculating first output neuron data based on the first input neuron data and the second weight values; and calculating one or more weight gradients to update the one or more first weight values.

Another example apparatus may include a floating-point number converter configured to receive one or more first weight values of a first bit length and first input neuron data, and convert the one or more first weight values to one or more second weight values of a second bit length, wherein the second bit length is less than the first bit length; and a computing unit configured to receive the first input neuron data from the neuron data cache, calculate first output neuron data based on the first input neuron data and the second weight values, and calculate one or more weight gradients based on the second weight values.

An example system in which compression coding may be implemented may include an input/output (I/O) interface configured to exchange data with peripheral devices; a central processing unit (CPU) configured to process the data received via the I/O interface; a neural network processor configured to process at least a portion of the received data, wherein the neural network processor includes: a floating-point number converter configured to receive one or more first weight values of a first bit length and first input neuron data, and convert the one or more first weight values to one or more second weight values of a second bit length, wherein the second bit length is less than the first bit length, and a computing unit configured to receive the first input neuron data, calculate the first output neuron data based on the first input neuron data and the second weight values, and calculate one or more weight gradient to update the one or more first weight values; and a memory configured to store the first weight values and input data that includes the first neuron data.

Another example system in which compression coding may be implemented may include an input/output (I/O) interface configured to exchange data with peripheral devices; a central processing unit (CPU) configured to process the data received via the I/O interface; a neural network processor configured to process at least a portion of the received data, wherein the neural network processor includes: a floating-point number converter configured to: receive one or more first weight values of a first bit length and first input neuron data, and convert the one or more first weight values to one or more second weight values of a second bit length, wherein the second bit length is less than the first bit length, and a computing unit configured to: receive the first input neuron data, calculate the first output neuron data based on the first input neuron data and the second weight values, and calculate one or more weight gradients based on the second weight values; and a memory configured to store the first weight values and input data that includes the first neuron data.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

Neural networks are a family of models for a broad range of emerging machine learning and pattern recondition applications. Neural networks techniques are conventionally executed on general-purpose processors such as Central Processing Unit (CPU) and General-purpose Graphics Processing Units (GPGPU). However, general-purpose processors may be limited to computing floating-point numbers of a single format. The capability of processing one single format of floating-point numbers may lead to unnecessary accuracy while increasing power consumption and memory usage.

Figure 1:
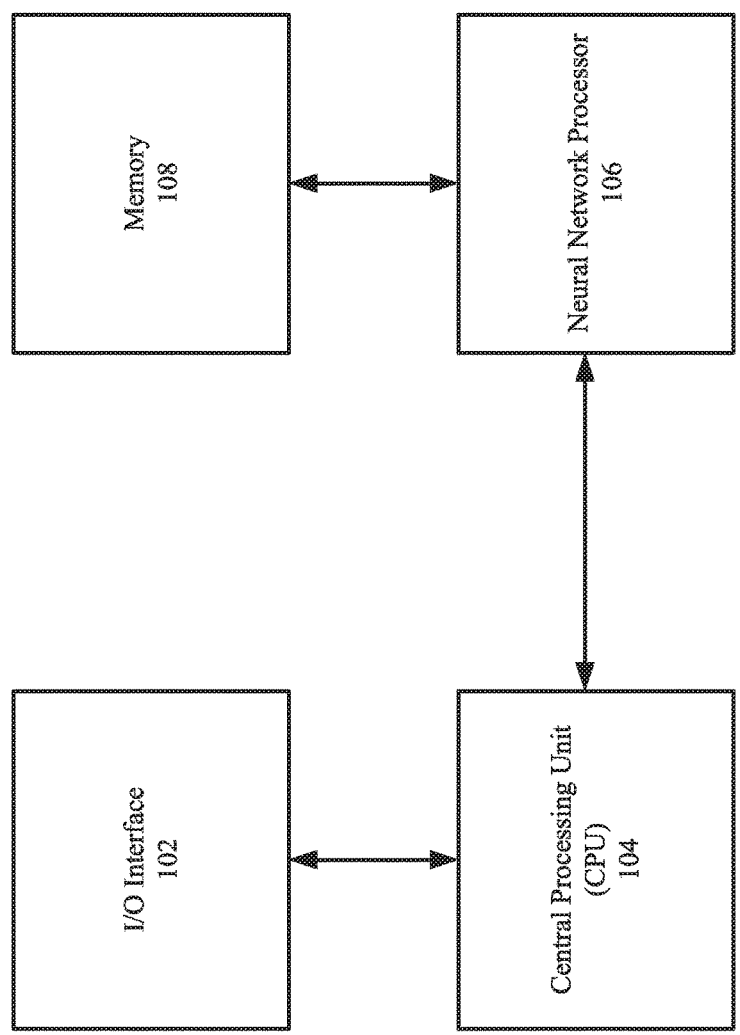
FIG. 1 is a block diagram illustrating an example computer system 100 in which compression coding for neural networks may be implemented.

FIG. 1 is a block diagram illustrating an example computer system 100 in which compression coding for neural networks may be implemented. The example computer system 100 may include at least an I/O interface 102, a central processing unit (CPU) 104, a neural network processor 106, and a memory 108. The I/O interface 102 may be configured to exchange data or information with peripheral devices, e.g., input devices, storage devices, etc. Data received from the I/O interface 102 may be further processed at the CPU 104. Data that require processing at an multi-layer neural network (MNN) may be transmitted to the neural network processor 206. For example, the forward propagation process and the backward propagation process described below may be performed at the neural network processor 206. Other data for the forward propagation process and the backward propagation process, e.g., weight values, may be retrieved from the memory 108 and stored on the neural network processor 206 during the processes. The neural network processor 106 may be described in further detail below.

Figure 2:
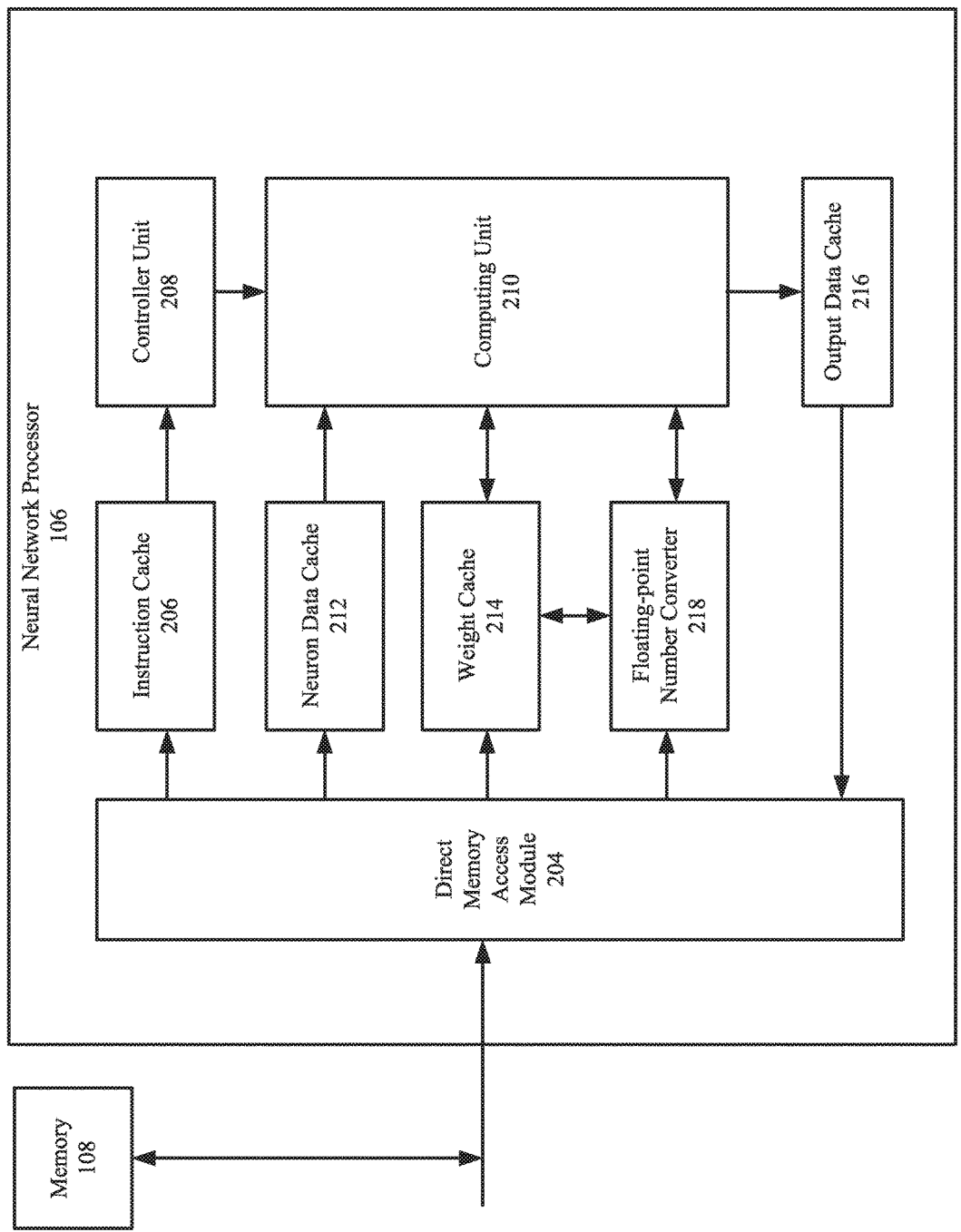
FIG. 2 is a block diagram illustrating an example neural network processor 106 in which compression coding for neural network may be implemented.

FIG. 2 is a block diagram illustrating an example neural network processor 106 in which compression coding for neural network may be implemented. Referring to FIG. 2, The input data and/or the weight values may be transmitted to and temporarily stored in a neuron data cache 212 and/or a weight cache 214. The neuron data cache 212 may be further configured to store first input neuron data, first output neuron data, output gradients, and input gradients for different layers of operations in a neural network. The weight cache 214 may be further configured to store weight gradients for different layers of operations in the neural network. The neuron data cache 212 and weight cache 214 may refer to one or more high-speed storage devices incorporated within the neural network processor 206 and configured to store the input data and the weight values respectively. The input data and/or the weight values may be transmitted to a computing unit 210 for further processing.

The neural network processor 106 may further include an instruction cache 206 and a controller unit 208. The instruction cache 206 may refer one or more storage devices configured to store instructions received from the CPU 104. The controller unit 208 may be configured to read the instructions from the instruction cache 206 and decode the instructions.

Upon receiving the decoded instructions from the controller unit 208, the input data from the neuron data cache 212, and the weight values from the weight cache 214, the computing unit 210 may be configured to calculate one or more groups of output data based on the weight values and the input data in a forward propagation process. In some other examples, the computing unit 210 may be configured to calculate weight gradients to weight values and/or bias gradients to update one or more bias values in a backward propagation process.

The computing unit 210 may further include one or more multipliers configured to multiply the modified input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

The generated output data may be temporarily stored in an output data cache 216 and may be further transmitted to the memory 108 via a direct memory access (DMA) module 204.

In some examples, the neural network processor 106 may further include a floating-point number converter 218 for converting weight values of different big lengths respectively for the forward propagation process and the backward propagation process. For example, the floating-point number converter 218 may be configured to convert first weight values that are stored in weight cache 214 into second weight values. The bit length of the second weight values are less than the bit length of the first weight values.

Figure 3:
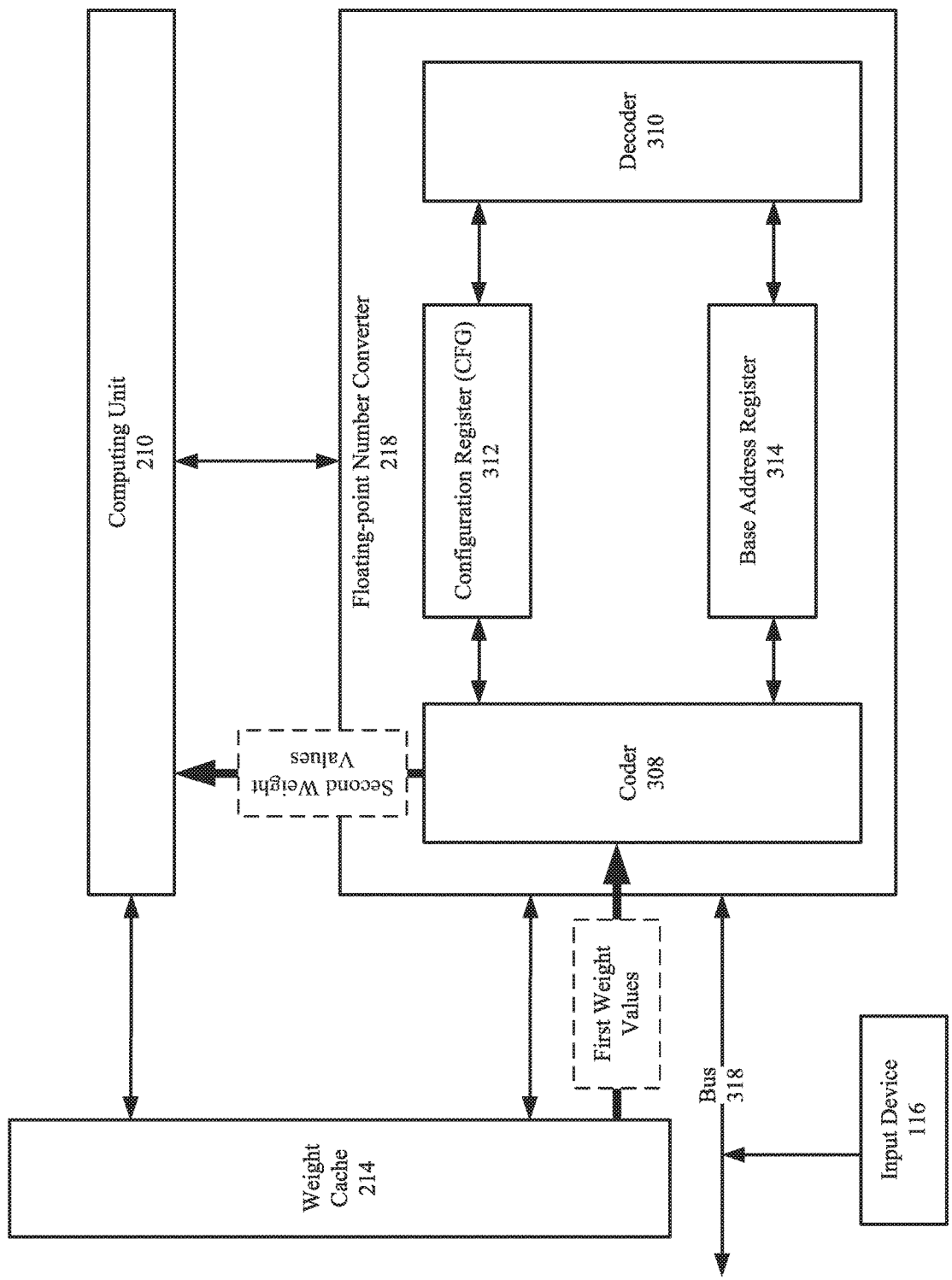
FIG. 3 is a block diagram that illustrates an example floating-point number converter 218 in which compression coding may be implemented.

FIG. 3 is a block diagram that illustrates an example floating-point number converter 218 in which compression coding may be implemented. The floating-point number converter 218 and the components therein may be implemented as hardware, firmware, or software components, or any combination thereof.

As depicted, the floating-point number converter 218 may be configured to receive one or more first weight values of a first bit length from an input device 116 or from the weight cache 214. The first weight values may be formatted as floating-point numbers.

The one or more first weight values may be converted by the floating-point number converter 218 to one or more second weight values of a second bit length for further computing. In some examples, the second weight values may be also formatted as floating-point numbers.

In some examples, the first weight values may be received from the input device 116 via a bus 318. Data may be transmitted and/or received via the bus 318 to and from other components that are not shown in FIG. 3. Each of the first weight values may be represented as $(-1)^{S1} \times (1+M1) \times 2^{E1}$, in which S1 denotes the sign of the corresponding first weight values, M1 denotes the mantissa of the corresponding first weight value, and E1 denotes the exponent of the corresponding first weight value.

In other words, each of the first weight values, when stored as a series of bits, may include a first sign bit, a first exponent field, and a first mantissa field. The first sign bit may refer to a bit that indicates the sign of the corresponding first weight value and may be assigned with a value of 0 or 1. The first exponent field may refer to a number of bits that store a value of the exponent of the corresponding first weight value. The bit length of the first exponent field may be referred to as K1 hereinafter. The first mantissa field may refer to a number of bits that store a value of the mantissa of the corresponding first weight value. The bit length of the first mantissa field may be referred to as K2 hereinafter. In an example of IEEE 754 standard (single type), K1 and K2 may be respectively set to 8 and 23.

In some aspects, an exponent bit length and a base value may be received from the input device 116 via the bus 318 along with the first weight values. The exponent bit length (may be referred to as "N") may be calculated based on the first exponent fields of the first weight values. For example, the exponent bit length N may be calculated based on a maximum value and a minimum value of the first exponent fields, e.g., in accordance with a formula:

$N = \log_2(E_{max} - E_{min})/2$, in which $E_{max}$ refers to the maximum value of the first exponent fields, and $E_{min}$ refers to the minimum value of the first exponent fields.

The base value (may be referred to as "A") may be similarly calculated based on the maximum value and the minimum value of the first exponent fields, e.g., in accordance with another formula: $A = (E_{max} - E_{min})/2$, in which $E_{max}$ refers to the maximum value of the first exponent fields and $E_{min}$ refers to the minimum value of the first exponent fields.

In these aspects, the exponent bit length N and the base value A may be calculated outside the floating-point number converter 218 prior to being transmitted from the input device 116. In some other aspects, the exponent bit length N and the base value A may be temporarily stored in the weight cache 214 after being received via the bus 118 and may be further retrieved by the floating-point number converter 218 at a later time for converting. In some other aspects, subsequent to receiving the first weight values, the floating-point number converter 218 may be configured to calculate the exponent bit length N and the base value A similarly based on the maximum value and the minimum value of the first exponent fields.

According to the present aspects, the floating-point number converter 218 may further include a coder 308, a decoder 310, a configuration register (CFG) 312, and a base address register 314. The CFG 312 and the based address register 114 may respectively refer to a portion of an on-board memory integrated in the floating-point number converter 218 and, thus, may provide direct access for the coder 308 and the decoder 310. The CFG 312 may be configured to store the exponent bit length N and the base address register 114 may be configured to store the base value A.

After the floating-point number converter 218 receives the first weight values, the coder 308 may be configured to calculate one or more second weight values. Similar to the first weight values, each of the second weight values may be represented as $(-1)^{S2} \times (1+M2) \times 2^{E2}$, in which S2 denotes the sign of the corresponding second floating-point number, M2 denotes the mantissa of the corresponding second floating-point number, and E2 denotes the exponent of the corresponding second floating-point number. Each of the second weight values may respectively correspond to one of the first weight values. That is, each second floating-point number may be calculated based on a corresponding first weight values and other parameters of the group of first weight values. However, a bit length of the second weight values (e.g., a total number of bits of each second floating-point number) or a bit length of a mantissa of the second weight values may be different from that of the first weight values. In some aspects, the bit length of the second weight values may be preset to a fixed value, e.g., 16, 32, 64, 128, etc., which may be less than the bit length of the first weight values.

That is, each of the second weight values, as a series of bits, may include a second sign bit, a second exponent field, and a second mantissa field. Similar to the first sign bit, the second sign bit may refer to a bit that indicates the sign of the corresponding second weight values and may be assigned with a value of 0 or 1. The second exponent field may refer to one or more bits that store a value of the exponent of the corresponding second weight value. The second mantissa field may refer to one or more bits that store a value of the mantissa of the corresponding second weight value. In some other examples, the bit length of the second mantissa field of the second weight values may be less than the first mantissa field of the first weight values.

To calculate the second weight values, the coder 308 may be configured to determine the bit lengths of the second exponent field and the second mantissa field. For example, the coder 308 may be configured to determine the bit length of the second exponent field to be the same as the calculated exponent bit length N. The bit length of the second mantissa field may be determined by the coder 308 in accordance with a formula: $L2 = C - N - 1$, in which L2 denotes the bit length of the second mantissa field of the corresponding second floating-point number, N denotes the exponent bit length, and C denotes the preset bit length of the second floating-point numbers.

Further, the coder 308 may be configured to determine the respective values of the second sign bit, the second exponent field, and the second mantissa field. In some aspects, the coder 308 may be configured to assign the second sign bit a same value as the first sign bit. The value of the second exponent field may be calculated by the coder 308 based on a corresponding first exponent field, an exponent bias of the first weight values, and the base value A stored in the base address register 314. The exponent bias of the first weight values are determined by the format standard of the first floating-point numbers. For example, if the first weight values are in compliance with IEEE 754 standard (single type), the exponent bias of the weight values may be set to 127 according to the IEEE 754 standard. The value of the second exponent field may be determined in accordance with the following example formula: E2=E1−B+A, in which E2 denotes the value of the second exponent field, E1 denotes the value of the first exponent field, B denotes the exponent bias of the first floating-point numbers, and A denotes the base value.

Further to the aspects, the coder 308 may be configured to determine the value of the second mantissa field. As the bit length of the second mantissa field may have been determined, the coder 308 may be configured to select one or more most significant bits (MSB) of the corresponding first mantissa field to be the value of the second mantissa field. The number of MSBs may be the determined bit length of the second mantissa field, e.g., C−N−1, in which N denotes the exponent bit length and C denotes the preset bit length of the second weight values. In an example that the first weight values comply with IEEE 754 (single type) and the second weight values comply with IEEE 754-2008 (Half), the bit length of the first mantissa field may be set to 23 and the bit length of the second mantissa field may be set to 10. In this example, the coder 308 may be configured to select the 10 MSBs of the first mantissa field and assign the 10 MSBs to be the value of the second mantissa field.

When the respective values and bit lengths of different fields of the second weight values are determined, the second weight values are calculated; that is, the first weight values are converted to the second weight values.

In some aspects, the calculated second floating-point numbers may be further transmitted by the floating-point number converter 218 to the computing unit 210 for forward propagation process or backward propagation process. The processes may include operations such as multiplication, addition, etc. as further described in detail below.

Figure 4:
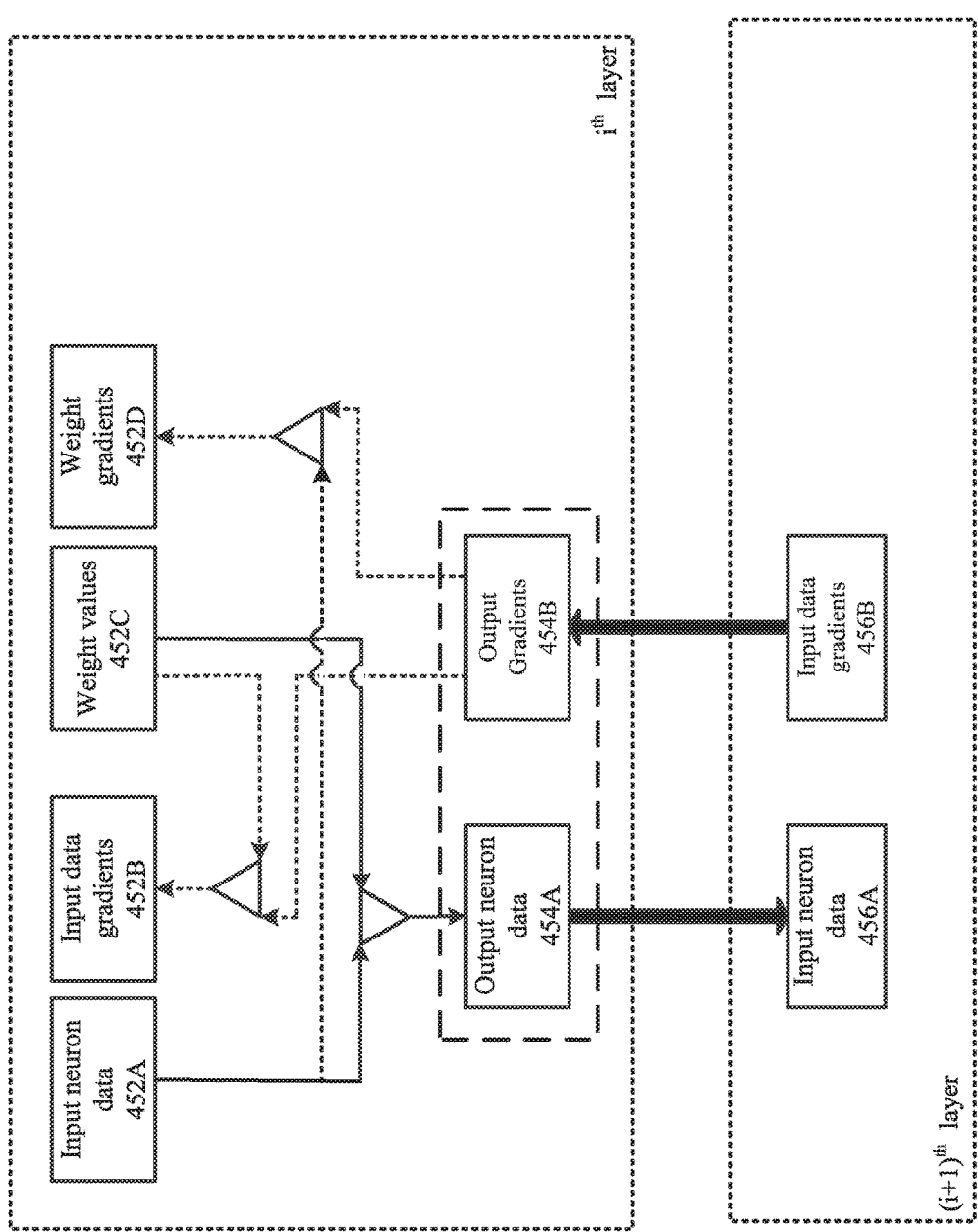
FIG. 4 is a block diagram illustrating an example computing process at an example computing unit in which compression coding may be implemented.

FIG. 4 is a block diagram illustrating an example computing process at an example computing unit 210. The computing process is a merely example showing neural network operations that involve input neuron data and weight values and should not be limited to such operations. For example, other unshown neural network operations may include pooling operations, etc.

The forward propagation computation of multilayer artificial neural networks according to embodiments of the present disclosure comprises operations in two or more layers. For each layer, a dot product operation may be performed to an input vector and a weight vector and from the result is obtained an output neuron through an activation function. The activation function may be sigmoid function, tan h function, relu function, softmax function, etc.

As depicted, the example computing process may be performed from the $i^{th}$ layer to the $(i+1)^{th}$ layer. The term "layer" here may refer to a group of operations, rather than a logic or a physical layer. A triangular-shaped operator (Δ as shown in FIG. 4) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire process. Rather, the layers of operations may refer to any two consecutive layers in a neural network. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 452A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 452A may be multiplied or convolved by one or more weight values 452C (e.g., the second weight values generated by the floating-point number converter 218). The results of the multiplication or convolution may be transmitted as output neuron data 454A. The output neuron data 454A may be transmitted to the next layer (e.g., the $(i+1)^{th}$ layer) as input neuron data 456A. The forward propagation process may be shown as the solid lines in FIG. 4.

The backward propagation process may start from the last layer of the forward propagation process. For example, the backward propagation process may include the process from the $(i+1)^{th}$ layer to the $i^{th}$ layer. During the process, the input data gradients 456B may be transmitted to the $i^{th}$ layer as output gradients 454B. The output gradients 454B may then be multiplied or convolved by the input neuron data 452A to generate weight gradients 452D.

In some examples, the computing unit 210 may be further configured to update the first weight values stored in weight cache 214 based on the generated weight gradients 452D. The updated first weight values may be converted to updated second weight values by the floating-point number converter 218. The updated second weight values may be transmitted to the computing unit 210 for future processing at the $i^{th}$ layer.

In some other examples, the computing unit 210 may continue to use weight values 452C for the processing at the $i^{th}$ layer without updating the first weight values in the weight cache 214.

Additionally, the output gradients 454B may be multiplied by the weight values 452C to generate input data gradients 452B. The backward propagation process may be shown as the dotted lines in FIG. 4.

Figure 5:
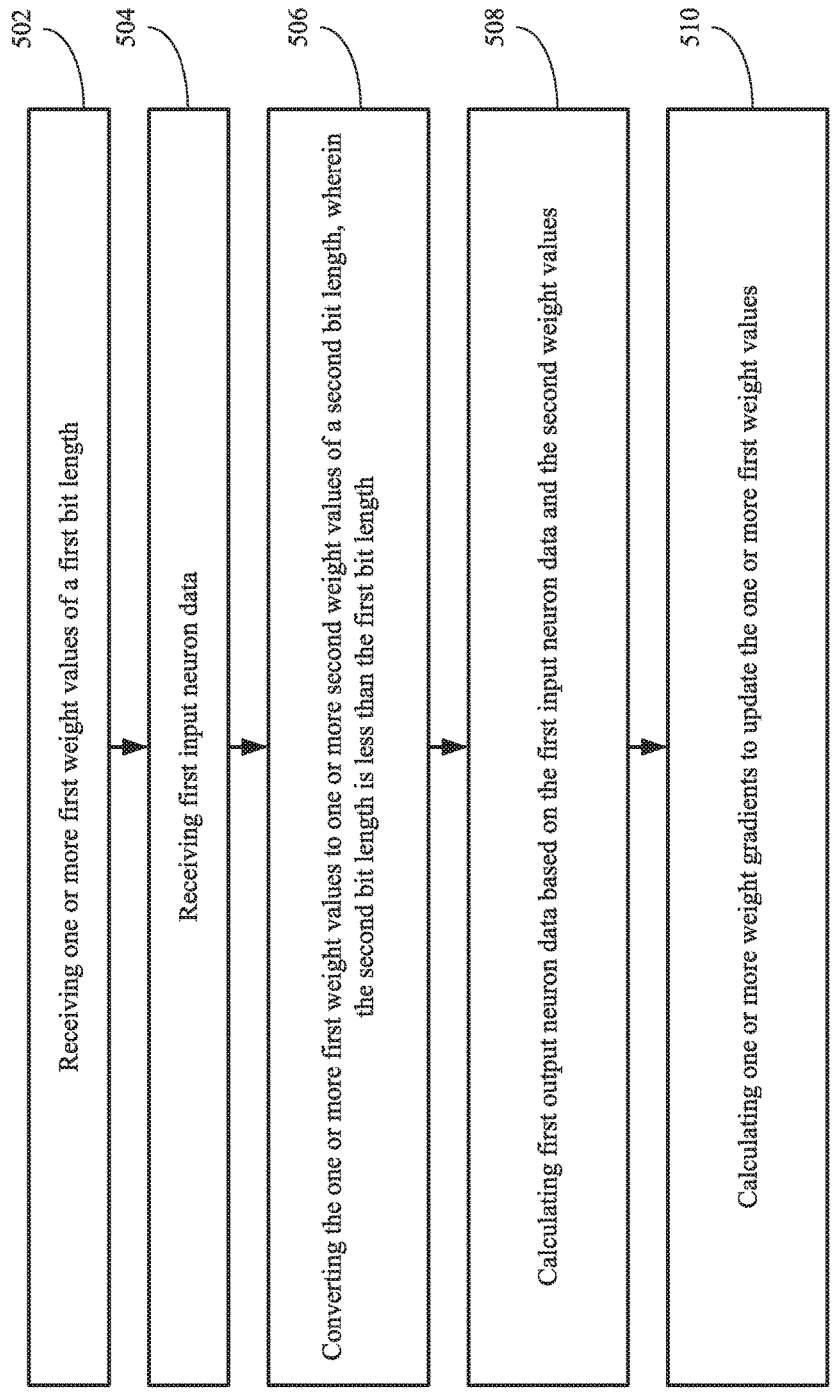
FIG. 5 is a flow chart illustrating an example method for compression coding in a neural network.

FIG. 5 is a flow chart illustrating an example method 500 for compression coding in a neural network. The example method 500 may be performed by one or more components of the neural network processor 106 as described in FIG. 2.

At block 502, method 500 may include receiving, by the weight cache 214, one or more first weight values of a first bit length. The weight cache 214 may be configured to transmit the one or more first weight values to the floating-point number converter 218.

At block 504, method 500 may include receiving, by the neuron data cache 212, first input neuron data. In some example, the input neuron data may include one or more vectors as the input at a layer of the neural network. The first input neuron data may be of the first bit length. The neuron data cache 212 may be configured to transmit the first input neuron data to the computing unit 210.

At block 506, method 500 may include converting the one or more first weight values to one or more second weight values of a second bit length. The second bit length may be less than the first bit length. As described in detail in accordance with FIG. 3, the second weight values may be transmitted to the computing unit 210 by coder 308.

At block 508, method 500 may include calculating first output neuron data based on the first input neuron data and the second weight values. That is, the computing unit 210 may be configured to multiply or convolve the second weight values (e.g., weight values 452C) with the input neuron data 452A to generate output neuron data 454A.

At block 510, method 500 may include calculating one or more weight gradients to update the one or more first weight values. In some examples, the computing unit 210 may be further configured to calculate the weight gradients. For example, the backward propagation process may include the process from the $(i+1)^{th}$ layer to the $i^{th}$ layer. During the process, the input data gradients 456B may be transmitted to the $i^{th}$ layer as output gradients 454B. The output gradients 454B may then be multiplied or convolved by the input neuron data 452A to generate weight gradients 452D by the computing unit 210.

Additionally, during the forward propagation process, the computing unit 210 or the components included therein (e.g., the multipliers, the adders, the activation processor, etc.) may be further configured to perform one or more operations including multiplying a first portion of the first neuron data by a second portion of the first neuron data, adding multiplication results output from the one or more multipliers, applying an activation function to addition results output from the one or more adders; and performing a pooling operation to activation results output from the activation units. The pooling operation may refer to any of the pooling operations (e.g., max-pooling (MAXPOOLING) or average pooling (AVGPOOLING)).

Further, the computing unit 210 may be configured to update the first weight values based on the calculated weight gradients (e.g., weight gradients 452D).

Further still, the floating-point number converter 218 may be configured to convert the first input neuron data (e.g., input neuron data 452A) to second input neuron data of the second bit length. That is, the input neuron data may be transmitted from the computing unit 210 to the floating-point number converter 218 and be converted to one or more floating-point numbers of a bit length equal to the bit length of the second weight values. The conversion of the input neuron data may be implemented in accordance with the process described in FIG. 3 except the first weight values may be replaced by the input neuron data.

Similarly, the floating-point number converter 218 may be configured to convert the first output neuron data to second output data of the second bit length. That is, the output neuron data (e.g., output neuron data 454A) may be transmitted from the computing unit 210 to the floating-point number converter 218 and be converted to one or more floating-point numbers of a bit length equal to the bit length of the second weight values. The conversion of the output neuron data may be implemented in accordance with the process described in FIG. 3 except the first weight values may be replaced by the output neuron data.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A neural network processor, comprising:
   a floating-point number converter configured to:
   receive one or more first weight values of a first bit length and first input neuron data, and
   convert the one or more first weight values to one or more second weight values of a second bit length, wherein the second bit length is less than the first bit length; and
   a computing unit configured to:
   receive the first input neuron data, and
   calculate first output neuron data based on the first input neuron and the second weight values, wherein the computing unit includes:
   one or more multipliers configured to multiply a first portion of the first input neuron data by a second portion of the first input neuron data;
   one or more adders configured to add multiplication results output from the one or more multipliers; and
   one or more activation units configured to apply an activation function to addition results output from the one or more adders.

2. The neural network processor of claim 1, wherein the computing unit is further configured to calculate one or more weight gradients to update the one or more first weight values.

3. The neural network processor of claim 1, further comprising
   a weight cache configured to store the one or more first weight values, and
   a neuron data cache configured to store the first input neuron data.

4. The neural network processor of claim 2, wherein the computing unit includes:
   one or more pooling components configured to perform a pooling operation to activation results output from the activation units.

5. The neural network processor of claim 2, wherein the computing unit is further configured to:
   calculate the one or more weight gradients based on output gradients; and update the first weight values based on the calculated weight gradients.

6. The neural network processor of claim 1, wherein the floating-point number converter is further configured to:
convert the first input neuron data to second input neuron data of the second bit length; and
convert the first output neuron data to second output neuron data of the second bit length.

7. The neural network processor of claim 1, wherein
each of the first weight values includes a first sign bit, a first exponent field, and a first mantissa field; and
each of the second weight values includes a second sign bit, a second exponent field, and a second mantissa field, wherein a bit length of the second mantissa field is less than a bit length of the first mantissa field.

8. The neural network processor of claim 7, wherein a bit length of the second sign bit is the same as a bit length of the first sign bit.

9. The neural network processor of claim 7, wherein a bit length of the second exponent field is determined based on a maximum value of the first exponent fields of the first weight values and a minimum value of the first exponent fields of the first weight values.

10. The neural network processor of claim 1, further comprising
a controller unit configured to receive an instruction and decode the instruction into one or more micro-instructions;
a direct memory access module configured to exchange data with an external memory;
an instruction cache configured to store instructions received from the direct memory access module; and
an output data cache configured to store the first output neuron data and the second output neuron data.

11. A method for processing neural network data, comprising:
receiving, by a floating-point number converter, one or more first weight values of a first bit length and first input neuron data;
converting, by the floating-point number converter, the one or more first weight values to one or more second weight values of a second bit length, wherein the second bit length is less than the first bit length;
receiving, by a computing unit, the first input neuron data; and
calculating, by the computing unit, first output neuron data based on the first input neuron and the second weight values, wherein the calculating further includes:
multiplying, by one or more multipliers, a first portion of the first input neuron data by a second portion of the first input neuron data;
adding, by one or more adders, multiplication results output from the one or more multipliers; and
applying, by one or more activation units, an activation function to addition results output from the one or more adders.

12. The method of claim 11, further comprising calculating, by the computing unit, one or more weight gradients to update the one or more first weight values.

13. The method of claim 11, further comprising:
storing, by a weight cache, the one or more first weight values, and
storing, by a neuron data cache, the first input neuron data.

14. The method of claim 12, further comprising performing, by one or more pooling components, a pooling operation to activation results output from the activation units.

15. The method of claim 12, further comprising:
calculating, by the computing unit, the one or more weight gradients based on output gradients; and
updating, by the computing unit, the first weight values based on the calculated weight gradients.

16. The method of claim 11, further comprising:
converting, by the floating-point number converter, the first input neuron data to second input neuron data of the second bit length; and
converting, by the floating-point number converter, the first output neuron data to second output neuron data of the second bit length.

17. The method of claim 11,
wherein each of the first weight values includes a first sign bit, a first exponent field, and a first mantissa field; and
wherein each of the second weight values includes a second sign bit, a second exponent field, and a second mantissa field,
wherein a bit length of the second mantissa field is less than a bit length of the first mantissa field.

18. The method of claim 17, wherein a bit length of the second sign bit is the same as a bit length of the first sign bit.

19. The method of claim 17, further comprising determining a bit length of the second exponent field based on a maximum value of the first exponent fields of the first weight values and a minimum value of the first exponent fields of the first weight values.

20. The method of claim 11, further comprising:
receiving, by a controller unit, an instruction and decode the instruction into one or more micro-instructions;
exchanging, by a direct memory access module, data with an external memory;
storing, by an instruction cache, instructions received from the direct memory access module; and
storing, by an output data cache, the first output neuron data and the second output neuron data.

21. An apparatus for neural network processing, comprising
an input/output (I/O) interface configured to exchange data with peripheral devices;
a central processing unit (CPU) configured to process the data received via the I/O interface;
a neural network processor configured to process at least a portion of the received data, wherein the neural network processor includes:
a floating-point number converter configured to:
receive one or more first weight values of a first bit length and first input neuron data, and
convert the one or more first weight values to one or more second weight values of a second bit length, wherein the second bit length is less than the first bit length, and
a computing unit configured to:
receive the first input neuron data,
calculate the first output neuron data based on the first input neuron data and the second weight values, and
calculate one or more weight gradients based on the second weight values, wherein the computing unit further includes:
one or more multipliers configured to multiply a first portion of the first input neuron data by a second portion of the first input neuron data;
one or more adders configured to add multiplication results output from the one or more multipliers; and
one or more activation units configured to apply an activation function to addition results output from the one or more adders; and
a memory configured to store the first weight values and input data that includes the first input neuron data.

22. The apparatus of claim 21, wherein the computing unit is further configured to calculate the one or more weight gradients based on output gradients and the second weight values.

23. The apparatus of claim 21, wherein the floating-point number converter is further configured to convert the first input neuron data to second input neuron data of the second bit length; and convert the first output neuron data to second output neuron data of the second bit length.

24. The apparatus of claim 21, wherein each of the first weight values includes a first sign bit, a first exponent field, and a first mantissa field; and each of the second weight values includes a second mantissa field, wherein a bit length of the second mantissa field is less than a bit length of the first mantissa field.

\* \* \* \* \*